(12) United States Patent
Tupa et al.

(10) Patent No.: US 9,261,929 B2
(45) Date of Patent: Feb. 16, 2016

(54) COOLING DEVICE CONTROL

(75) Inventors: Mark D. Tupa, Cypress, TX (US);
Michael R. Durham, Tomball, TX (US);
Christopher Rijken, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

(21) Appl. No.: 13/386,435

(22) PCT Filed: Aug. 20, 2009

(86) PCT No.: PCT/US2009/054552
§ 371 (c)(1),
(2), (4) Date: Jan. 23, 2012

(87) PCT Pub. No.: WO2011/022018
PCT Pub. Date: Feb. 24, 2011

(65) Prior Publication Data
US 2012/0123610 A1 May 17, 2012

(51) Int. Cl.
*G06F 1/20* (2006.01)
*G06F 11/30* (2006.01)

(52) U.S. Cl.
CPC .......... *G06F 1/206* (2013.01); *G06F 11/3034* (2013.01); *G06F 11/3058* (2013.01); *Y02B 60/1275* (2013.01)

(58) Field of Classification Search
CPC .......... H01L 2225/06589; G01K 7/00; G01K 7/425; G01K 2213/00; G06F 1/206; G06F 1/3225; Y02B 60/1275
USPC ................. 713/300, 320, 323, 340
See application file for complete search history.

(56) References Cited

U.S. PATENT DOCUMENTS

| | | | | |
|---|---|---|---|---|
| 4,667,480 A | * | 5/1987 | Bessler | 62/180 |
| 5,422,806 A | * | 6/1995 | Chen et al. | 700/29 |
| 5,996,084 A | * | 11/1999 | Watts | 713/323 |
| 6,134,667 A | * | 10/2000 | Suzuki et al. | 713/300 |
| 6,363,490 B1 | * | 3/2002 | Senyk | 713/300 |
| 6,996,441 B1 | * | 2/2006 | Tobias | 700/44 |
| 7,167,993 B1 | * | 1/2007 | Thomas et al. | 713/322 |
| 7,418,611 B1 | * | 8/2008 | Thomas et al. | 713/322 |
| 7,421,598 B2 | * | 9/2008 | Brittain | G06F 1/206 711/100 |
| 7,430,672 B2 | * | 9/2008 | Rotem et al. | 713/300 |
| 7,441,949 B2 | * | 10/2008 | Janzen | G01K 7/00 374/1 |
| 7,512,530 B2 | * | 3/2009 | Aguilar et al. | 703/13 |

(Continued)

FOREIGN PATENT DOCUMENTS

KR 10-0714875 5/2007

OTHER PUBLICATIONS

Sharifi Shervin, Liu ChunChen, Rosing Tajana Simunic, "Accurate Temperature Estimation for Efficient Thermal Management", 9th International Symposium on Quality Electronic Design, IEEE, 2008.*

(Continued)

*Primary Examiner* — Crystal J Barnes-Bullock
(74) *Attorney, Agent, or Firm* — Hewlett-Packard Patent Department

(57) ABSTRACT

A computing system can include a monitor (150) to estimate a temperature of a storage device (120). The monitor estimates the temperature from an activity indicating signal of the storage device. A cooling device controller (155) can be connected to the monitor. The cooling device controller can control the output of a cooling device (115).

22 Claims, 3 Drawing Sheets

(56) References Cited

U.S. PATENT DOCUMENTS

| | | | |
|---|---|---|---|
| 7,596,430 B2* | 9/2009 | Aguilar et al. | 700/299 |
| 7,852,138 B2* | 12/2010 | Kuusilinna | G01K 7/425 327/513 |
| 2002/0065049 A1* | 5/2002 | Chauvel et al. | 455/66 |
| 2004/0264125 A1 | 12/2004 | Cheng et al. | |
| 2005/0257078 A1* | 11/2005 | Bose et al. | 714/1 |
| 2007/0043478 A1* | 2/2007 | Ehlers et al. | 700/276 |
| 2007/0106428 A1* | 5/2007 | Omizo et al. | 700/300 |
| 2008/0162388 A1* | 7/2008 | de la Guardia et al. | 706/14 |
| 2008/0300725 A1* | 12/2008 | Brey et al. | 700/278 |
| 2009/0091996 A1* | 4/2009 | Chen et al. | 365/212 |
| 2009/0168324 A1 | 7/2009 | Lai et al. | |
| 2009/0290625 A1* | 11/2009 | Riddle et al. | 375/222 |
| 2010/0306598 A1* | 12/2010 | Ackaret et al. | 714/47 |
| 2010/0321881 A1* | 12/2010 | Ziarnik et al. | 361/679.48 |

OTHER PUBLICATIONS

International Searching Authority, International Search Report and Written Opinion, Appln No. PCT/US2009/054552, Date of Mailing May 18, 2010, 12 p.

* cited by examiner

COOLING DEVICE CONTROL

CROSS-REFERENCE TO RELATED APPLICATION

This application is a national stage application under 35 U.S.C. §371 of PCT/US2009/054552, filed Aug. 20, 2009.

BACKGROUND

Self-Monitoring, Analysis, and Reporting Technology (S.M.A.R.T.) is a signaling method between an internal disk drive electromechanical sensor and the host computer. A hard drive that implements S.M.A.R.T. may include an electromechanical sensor. A S.M.A.R.T. compliant hard drive communicates with the operating system of the host computer through device drivers. The most basic information that SMART provides is the SMART status. The SMART status is represented as "drive OK" or "drive fail" respectively.

BRIEF DESCRIPTION OF THE DRAWINGS

Some embodiments of the invention are described with respect to the following figures.

DETAILED DESCRIPTION

Figure 1:
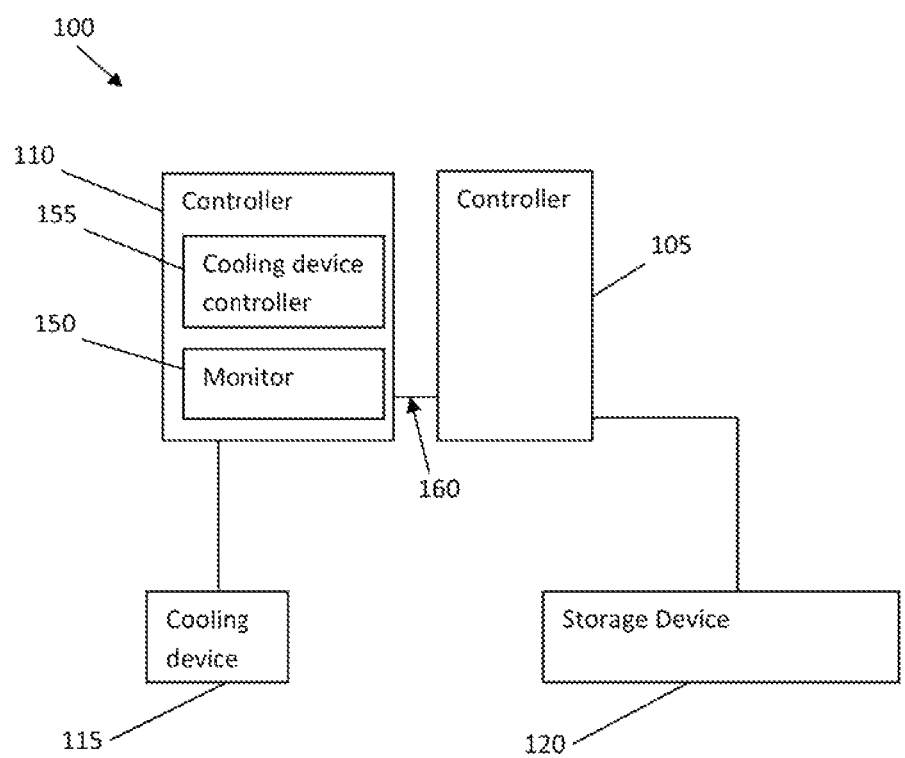
FIG. 1 is a block diagram according to an exemplary embodiment of the invention.

A solution to get temperature information of a storage device may be to use specific storage device drivers that poll the storage device for temperature data. This solution can be problematic because it uses specific storage device drivers which may not be present in the system. A storage device can be for example, a hard disk drive, an optical drive, a solid state disk drive or any other media for storing information in a computing system.

End users of computers may have images of a storage device that may include an operating system and applications that are specific to their use of the computer. If the correct storage device driver is not present on the end user's image the system does not get temperature information from the storage devices. If temperature information is not available then the cooling devices may operate at a level above the level that may be used if the temperature is known. If the cooling devices operate at an output level above the output level used if the temperature is known the system may not meet acoustic goals set for idle state conditions.

If the operating system image does have the correct storage device drivers to get temperature data from the storage device, the SMART drives do not supply temperature data unless the temperature passes a threshold. For example, the SMART drives may signal the drivers in the operating system that the storage device is operating above the threshold level set but it does not indicate what the temperature of the storage device is. A temperature exceeded value is intended to indicate that there is a relatively high probability that the drive will not be able to honor its specification in the future that is, the drive is about to fail.

A temperature sensor can be mounted on the drive logic board to record the temperature of the drive. A temperature can be set within the drive's control logic, and status notifications are sent by the drive back to the computing system if the temperature is exceeded. Thermal monitoring is integrated with the drive's SMART feature for reporting. For example, at 65 degrees Celsius the disk drive may signal the computing system that a temperature has been exceeded. The controller in the storage device can track the temperature but does not communicate the temperature of the sensor, the communication is that a temperature is being exceeded or has been exceeded.

Controlling storage device temperatures to within their thermal operating specifications can be difficult because there is no guarantee that a reliable method to get storage device temperature data will be available in the system. Without the temperature data the system cooling device controller cannot adjust to the current temperature when storage device temperatures exceed their thermal specifications. Continued long term operation of storage devices with temperatures above rated specifications can result in data loss due to reliability issues.

Increased storage device activity can result in increased storage device temperatures. Therefore, storage device activity levels can provide an indication of storage device temperatures. Storage device activity levels can be measured by monitoring the active duty cycle of the storage device activity indicator signal over a period of time. The storage device activity indicator signal may be connected to a light emitting diode LED or another visual indicator, in one embodiment.

In one embodiment, a computer storage device is accessed and an activity indicating signal is generated based on that access. A controller may generate the activity indicating signal or the storage device may generate the activity indicating signal. A monitor can receive the activity indicating signal and estimate the temperature of the storage device from the received activity indicating signal. The estimated temperature of the storage device can be used to generate a signal to a cooling device controller. The signal received by the cooling device controller is interpreted by the cooling device controller to change the output of the cooling device. For example if the cooling device is a fan the signal received by the cooling device controller may control the speed of the fan to lower the temperature if the estimated temperature of the storage device is above an operating specification for the storage device.

With reference to the figures, FIG. 1 is a block diagram according to an exemplary embodiment. The system 100 can adjust the cooling device 115 output from an estimate of the temperature of the storage device 120. The system 100 can include a cooling device 115 and a storage device 120, a controller 110, and a controller 105. The controller 105 may include for example a processor, a memory controller and an input output controller. The processor may be connected to the memory controller through a bus. The memory controller is connected to the input output controller. The input output controller can send and receive signals from devices connected to the input output controller.

The cooling device 115 may be part of a cooling system for example air cooling, a liquid submersion cooling, conductive cooling, radiative cooling or may be combinations of these systems. A cooling system may use fans, heat sinks, liquid pumps, heat pipes, phase change materials or combinations of these to adjust the temperature of the storage device 120. The cooling device controller 155 can adjust the properties of the different types of cooling devices to adjust the temperature of the storage device 120. In one embodiment the cooling device controller is a part of a controller 110, for example a super input output controller, or may be a separate component.

If the controller 105 is connected to a storage device 120 the input output controller sends data for writing to the storage device 120 and receives data read from the storage device 120. A controller 105 can generate an activity indicating signal 160 based on access to the computer storage device by the controller, in one embodiment. A monitor 150 can receive the activity indicating signal that indicates the activity of the storage device 120. In one embodiment, the monitor may be a part of the controller 110, for example a super input output controller 110, or may be a separate component.

A controller 110 can be connected to the controller 105. The controller 110 can perform standard input output functions done by multiple integrated circuits. For example the controller 110 may include a cooling device controller 155. The controller 110 can receive the activity indicating signal 160 indicating the activity of the storage device.

The controller 110 can estimate the temperature for the storage device. The estimate of the temperature of the storage device is determined from the amount of activity indicated by the monitor over a set period of time. For example, if the activity indicator indicated activity for 4 minutes over a 5 minute period of time, or 80 percent of the time, the storage device estimated temperature may be higher than if the activity indicator signal indicated activity for 1 minute over a 5 minute period of time or 20 percent of the time. In one embodiment the estimate of temperature can be determined by a table of estimated temperatures for an activity indicator signal over a period of time. For example a table may estimate the temperature of the storage device that has an active activity indicator signal for 4 minutes over a 5 minute period of time, or 80 percent of the time to be 55 degrees Celsius and 1 minute of activity over a 5 minute period of time, or 20 percent of the time, to be 40 degrees Celsius. In an alternative embodiment a formula can be used to generate the estimated temperature of the storage device.

The storage device on a computer is being accessed at different amounts over different periods of time. The amount of time that the indicator is monitored for may be determined based on the thermal properties of the storage device. For example storage devices whose temperature changes quickly may have temperature estimates taken over a 5 minute period of time. Conversely, storage devices whose temperature changes slowly may have temperature estimates taken over a 7 minute period of time.

In one embodiment, if the storage device 120 is operating at an estimated temperature that is within operating specifications of the storage device 120, the cooling device output may remain at a current level. If the storage device 120 is operating at an estimated temperature that is above the operating specification of the storage device it may be determined that the cooling device flow rate should increase from the current flow rate and if the storage device is operating at below operating specifications of the storage device it may be determined that the cooling device flow rate decreases from the current flow rate. Decreasing the cooling device flow rate from the current flow rate can reduce the noise generated by the cooling device and can reduce the power used by a computing system to maintain the temperature of the storage device. The cooling device controller 155 can increase or decrease the output of the cooling device 115. For example the cooling device controller can change the output of the cooling device by changing the speed of the cooling device, turning on or off additional cooling devices or changing the angle of blades of the cooling device.

Figure 2:
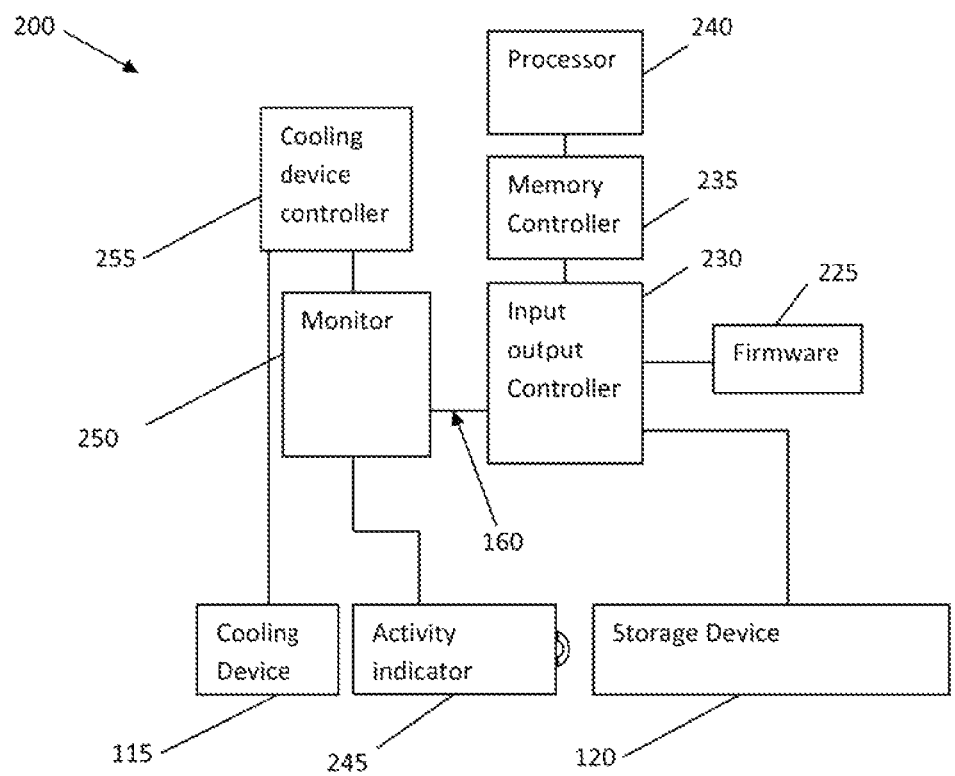
FIG. 2 is a block diagram according to an exemplary embodiment of the invention.

FIG. 2 is a block diagram according to an exemplary embodiment. The system 200 can adjust the cooling device 115 output from an estimate of the temperature of the storage device 120. The system 200 includes a cooling device 115, a storage device 120, a processor 240, a memory controller 235 and an input output controller 230. The processor 240 is connected to the memory controller through a bus. The memory controller is connected to the input output controller 230. The input output controller can send and receive signals from devices, such as a storage device connected to the input output controller 230.

If the input output controller 230 is connected to a storage device 120 and sends data for writing to the storage device and receives data read from the storage device 120, the input output controller 230 outputs an activity indicating signal 160. The activity indicating signal 160 is received by the monitor 250. The monitor 250 may be a part of a controller, for example a super input output controller, or may be a separate component. In one embodiment, the storage device 120 can output an activity indicating signal that can be received by the input output controller 230 or directly by the monitor 250. In one embodiment the input output controller can generate an activity indicating signal based on access to the storage device by the input output controller.

The cooling device controller 255 can be connected to the monitor 250. The cooling device controller 255 may be a part of a controller, for example a super input output controller, or may be a separate component. The monitor 250 can estimate the temperature for the storage device. The estimate of the temperature of the storage device can be determined from the amount of activity indicated to the monitor over a set period of time by the activity indicating signal 160. The signal received by the cooling device controller 255 from the monitor 250 can be used to adjust the output of the cooling device. In one embodiment the monitor can be connected to an activity indicator 245, for example an LED that gives a visual indication of storage device activity.

The basic input output system (BIOS) is firmware 225 stored on a non-volatile memory, designed to be the first code executed by a PC when powered on. In some embodiments the processor accesses the firmware. The firmware can include instructions that tell the input output controller 230 and the monitor 250 how to operate. If the monitor 250 is included in a controller, for example a super input output controller, the super input output controller may operate based on the firmware 225, that is located on the BIOS, to determine the estimated temperature of the storage device. The BIOS may also instruct the super input output controller how to scale the temperatures up or down. The BIOS may include a user interface that allows changes to be made to the operation of the computer system by making changes to the firmware that is read from the BIOS. For example, changing a setting in the BIOS may allow the cooling device controller to run the cooling devices efficiently based on the number of drives connected to the input/output controller 230. In one embodiment the input output controller can determine how many drives are connected to the input output controller and adjust the setting in the BIOS automatically. In one embodiment, the BIOS is a firmware referred to as an extensible firmware interface (EFI). The firmware can also set a target operating temperature for the storage devices and may allow adjustments to the target operating temperatures.

If there are multiple storage devices connected to the input/output controller 230, an input output controller may indicate the activity of all of the storage devices connected to the input output controller 230 with a single activity indicating signal. If the activity of multiple storage devices is indicated by one activity indicating signal, then the cooling device controller may signal the cooling device to raise the output to a higher rate than if the activity signal was for only a single storage device. For example if the monitored activity for the first storage device is 2 minutes over a 5 minute period of time, or 40 percent of the period of time, and the monitored activity for the second storage device is 2 minutes over a 5 minute period of time, or 40 percent of the period of time, the activity indicator may output a signal on as few as 2 minutes, or 40 percent, if the activity of the first and second storage device overlap. If for example the activity of the first and the second storage do not overlap the activity of the first and the second storage devices are added together and as many as 4 minutes, or 80 percent of the time the first and the second drives have activity. In the example, the activity may also be between 2 and 4 minutes over a 5 minute period of time or between 40 and 80 percent of the time if some but not all of the activity of the first storage device overlaps with some of the activity of the second storage device. In some embodiments the instructions on the firmware for the super input output controller can adjust the operation of the super input output to compensate for multiple storage devices so that activity of the storage devices may be scaled to a lower temperature than the temperature of a single storage device because the activity indicated by the activity indicating signal is attributed to all the drives connected to the input output controller and not a single drive connected to the input output controller.

Figure 3:
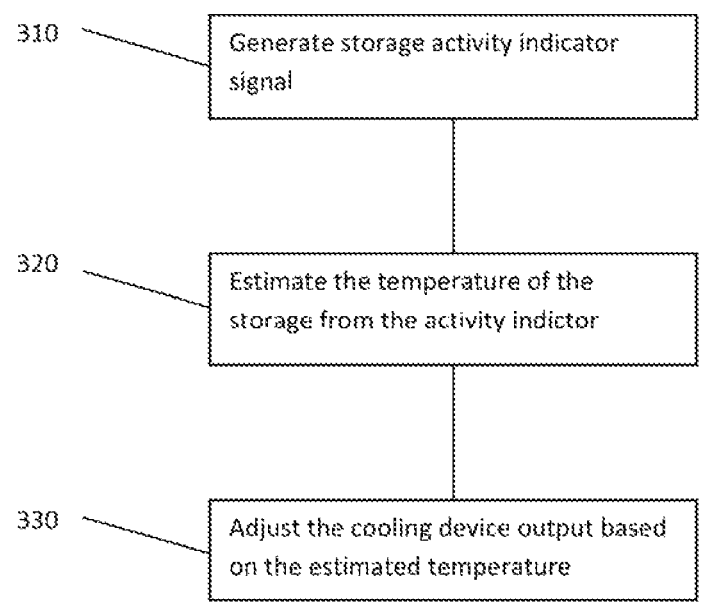
FIG. 3 is a flow diagram according to an exemplary embodiment of a method of the invention.

FIG. 3 is a flow diagram according to an exemplary embodiment of a method. The method begins by generating an activity signal if a storage device is accessed (at 310). The access to the storage device can be a read command sent to the storage device. The read command may contain an address indicating the location of the data that is being requested from the storage device. The access to the storage device may be a write command that includes the data to be written to the storage. The access to the storage device may also be other commands to the storage device.

In one embodiment the activity indicating signal is generated by an input output controller that is connected to the storage device to send access signals to the storage device. The controller generates the activity signal if the controller sends an access signal to the storage device. In an alternative embodiment the storage device activity indicating signal is generated by the storage device that is being accessed by the input output controller.

An estimate of the temperature of the storage device can be made from the activity signal over a period of time (at 320). In some embodiments the estimate of temperature is made by a monitor. The monitor can receive the activity signal from the controller or can receive the signal from the storage device if the storage device generates the signal. The estimate of the temperature can be determined by the monitor by comparing an amount of activity of the activity signal over a period of time to a table with corresponding amounts of activity and temperatures to estimate the temperature, in one embodiment.

In some embodiments a second storage device may be connected to the controller. The controller can send access signals to the storage device to perform read, write and other access to the storage device. If there are more than one storage device connected to the controller the activity signal generated by the controller can indicate access to each of the storage devices connected to the controller. If the storage device(s) are responsible for generating the activity signal, the activity signals from the storage devices can be multiplexed. For example the activity signal from the first storage device and the activity signal from the second storage device can be multiplexed into a single activity signal to be received by a monitor. The monitor may be included in an integrated circuit with other functions such as the cooling device controller.

The estimated temperature of the storage device can be used to adjust the output of a cooling device based on the estimated temperature (at 330). In one embodiment the output of the cooling device, for example a fan, is adjusted by adjusting the speed of the cooling device, but the output can also be adjusted by turning on or off additional cooling devices or may be by adjusting other features of the cooling device. In one embodiment an override signal can change the output of the cooling device. For example, if the cooling device controller is receiving a signal from the monitor, the override signal may indicate an increase or decrease from the cooling device output indicated by the signal from the monitor.

The estimated temperature of the storage device may be scaled based on the features of a computing system. For example, the scaling of the estimated temperature may use the number of storage device, the other heat generating components in the computing system such as the processor, and the types of cooling devices to scale the estimated temperature. The basic input output system includes firmware that may control the operation of an input output controller and a monitor.

The techniques described above may be embodied in a computer-readable medium for configuring a computing system to execute the method. The computer readable media may include, for example and without limitation, any number of the following: magnetic storage device media including disk and tape storage device media; optical storage device media such as compact disk media (e.g., CD-ROM, CD-R, etc.) and digital video disk storage device media; holographic memory; nonvolatile memory storage device media including semiconductor-based memory units such as FLASH memory, EEPROM, EPROM, ROM; ferromagnetic digital memories; volatile storage device media including registers, buffers or caches, main memory, RAM, etc. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing system comprising:
   a plurality of storage devices;
   a monitor to:
      receive activity indications representing respective accesses of the plurality of storage devices, the activity indications being based on a degree of overlap of activities of the plurality of storage devices due to the accesses of the plurality of storage devices, and
      estimate a temperature of the plurality of storage devices based on the received activity indications over a specified period of time; and
   a cooling device controller connected to the monitor to control an output of a cooling device in response to the estimated temperature.

2. The computing system of claim 1 further comprising an input output controller to generate the activity indications based on the accesses of the plurality of storage devices.

3. The computing system of claim 2 wherein the cooling device controller is to increase a speed of a fan in the cooling device in response to the estimated temperature being above an operating specification.

4. The computing system of claim 1 wherein the monitor is to estimate the temperature of the plurality of storage devices from the activity indications responsive to an operating system not including drivers for receiving the temperature of the plurality of storage devices.

5. The computing system of claim 1 further comprising firmware to scale the estimated temperature.

6. The computing system of claim 1, further comprising a data structure, wherein the monitor is to further:
   determine an amount of activity based on the activity indications over the specified period of time; and
   look up, based on the determined amount of activity, the data structure that maps different amounts of activities to corresponding temperatures,
   wherein the estimated temperature is a temperature in the data structure that maps to the determined amount of activity.

7. The computing system of claim 1, wherein a first activity indication of the activity indications is derived based on overlap of activities of a first subset of the storage devices.

8. The computing system of claim 7, wherein a second activity indication of the activity indications is derived by adding activities of a second subset of the storage devices whose activities do not overlap.

9. A method to adjust cooling device output comprising:
   generating activity indications in response to respective accesses of storage devices;
   estimating a temperature of the storage devices based on the activity indications over a period of time, the activity indications being based on a degree of overlap of activities of the storage devices due to the accesses of the storage devices; and
   controlling a cooling device based on the estimated temperature.

10. The method of claim 9 further comprising:
    determining an amount of activity based on the activity indications over the period of time; and
    looking up, based on the determined amount of activity, a table that maps different amounts of activities to corresponding temperatures,
    wherein the estimated temperature is a temperature in the table that maps to the determined amount of activity.

11. The method of claim 9 further comprising providing a signal to a cooling device controller based on the estimated temperature, the cooling device controller adjusting the cooling device in response to the signal.

12. The method of claim 9 further comprising comparing the estimated temperature to an operating specification.

13. The method of claim 12 further comprising increasing an output of the cooling device in response to the temperature being above the operating specification.

14. The method of claim 9 further comprising scaling an estimated temperature of the storage device to adjust an output of the cooling device.

15. The method of claim 9, further comprising varying the period of time depending upon a thermal property of the storage device.

16. The method of claim 15, wherein the period of time is set to a first time period in response to the thermal property of the storage device having a first characteristic, and set to a different time period in response to the thermal property of the storage device having a second, different characteristic.

17. The method of claim 9, wherein a first activity indication of the activity indications is derived based on overlap of activities of a first subset of the storage devices.

18. The method of claim 17, wherein a second activity indication of the activity indications is derived by adding activities of a second subset of the storage devices whose activities do not overlap.

19. A non-transitory computer readable medium comprising instructions that if executed cause a controller to:
    monitor activity indications responsive to accesses of storage devices over a period of time;
    estimate a temperature of the storage devices in response to the activity indications over the period of time, the activity indications being based on a degree of overlap of activities of the storage devices due to the accesses of the storage devices; and
    controlling an output of a cooling device based on the estimated temperature.

20. The computer readable medium of claim 19 further comprising instructions to determine if the estimated temperature is above an operating specification.

21. The computer readable medium of claim 19 further comprising instructions to increase a speed of the cooling device to adjust the output of the cooling device in response to the temperature of the storage devices being above an operating specification.

22. The computer readable medium of claim 19, wherein the instructions if executed cause the controller to further:
    determine an amount of activity based on the activity indications over the period of time; and
    look up, based on the determined amount of activity, a data structure that maps different amounts of activities to corresponding temperatures,
    wherein the estimated temperature is a temperature in the data structure that maps to the determined amount of activity.

* * * * *